United States Patent
Ahmad et al.

(10) Patent No.: US 10,139,257 B2
(45) Date of Patent: Nov. 27, 2018

(54) MULTIPHASE METER CALIBRATION SYSTEM AND METHODS THEREOF

(71) Applicant: KING FAHD UNIVERSITY OF PETROLEUM AND MINERALS, Dhahran (SA)

(72) Inventors: Aftab Ahmad, Dhahran (SA); Luai M. Alhems, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 169 days.

(21) Appl. No.: 15/088,563

(22) Filed: Apr. 1, 2016

(65) Prior Publication Data

US 2017/0284853 A1   Oct. 5, 2017

(51) Int. Cl.
*G01F 25/00* (2006.01)
*G01F 1/74* (2006.01)

(52) U.S. Cl.
CPC ............ *G01F 1/74* (2013.01); *G01F 25/0038* (2013.01)

(58) Field of Classification Search
CPC ................. G01F 25/0007; G01F 23/20; G01F 25/00007; G01F 23/02
USPC ........................................................ 73/1.73
See application file for complete search history.

(56) References Cited

U.S. PATENT DOCUMENTS

| 8,641,813 B2 | 2/2014 | Gysling |
| 9,134,160 B2 | 9/2015 | Ahmad et al. |
| 2015/0135797 A1 | 5/2015 | Romero et al. |

*Primary Examiner* — Lisa Caputo
*Assistant Examiner* — Rodney T Frank
(74) *Attorney, Agent, or Firm* — Oblon, McClelland, Maier & Neustadt, L.L.P.

(57) ABSTRACT

A closed loop system for the calibration of a multiphase meter, such as a multiphase flow meter or water cut meter, and a method of employing the system in calibration of multiphase meters in crude oil production processes. The system includes an oil and water separation vessel, oil and water flow meters, valves, pumps, and a single phase calibration unit. The system employs a two-step calibration process. First internal single phase oil and water meters are calibrated using the single phase calibration unit; subsequently multiphase meter calibration is achieved using the two precalibrated single phase flow meters.

20 Claims, 4 Drawing Sheets

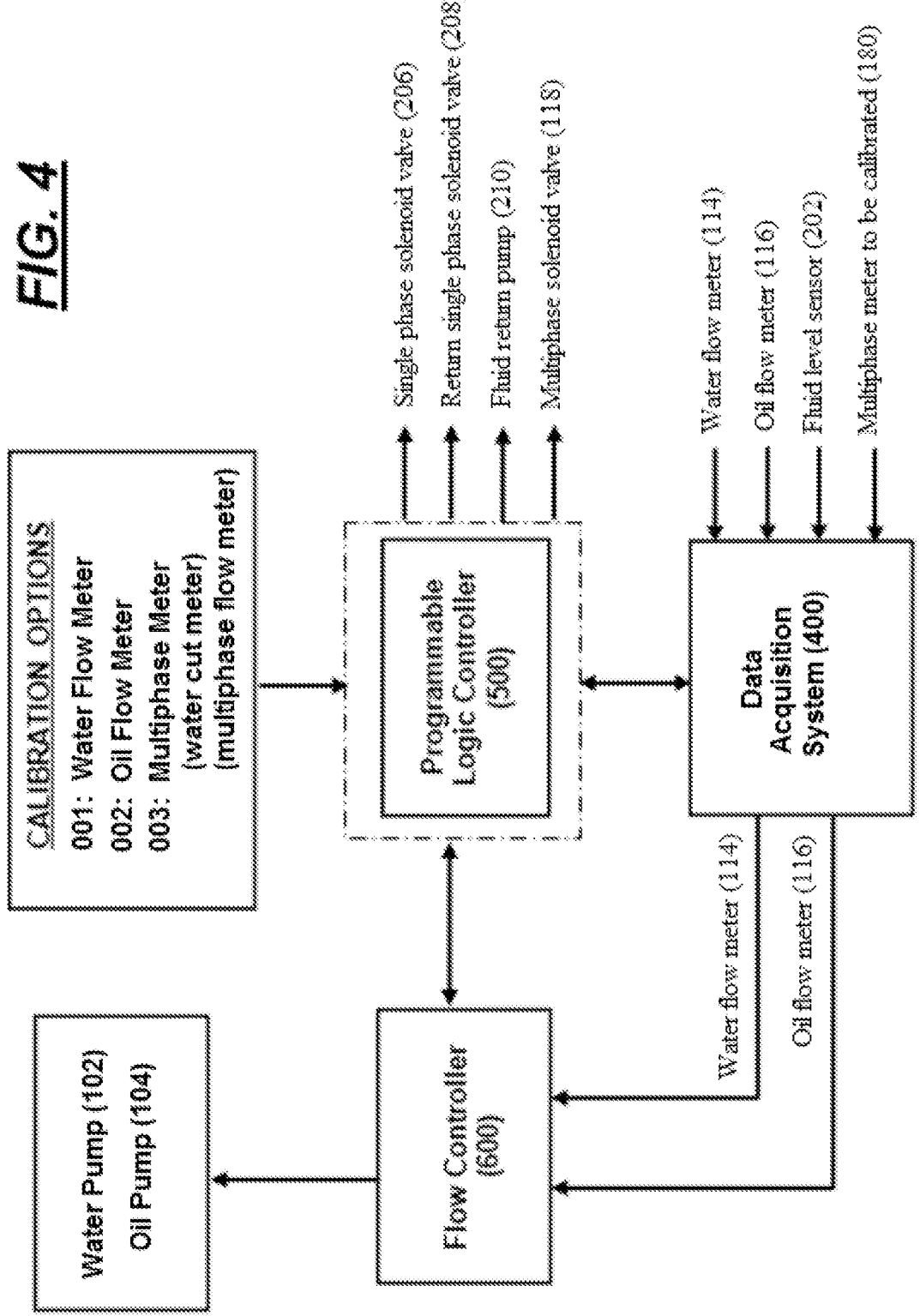

MULTIPHASE METER CALIBRATION SYSTEM AND METHODS THEREOF

BACKGROUND OF THE INVENTION

Technical Field

The present disclosure relates to a system and method for the calibration of a multiphase meter, such as a multiphase flow meter or a water cut meter employing a closed loop multiphase flow system.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Liquid measuring devices are used in a wide variety of commercial applications. The measurement of two-phase of multiphase flow quantities is essential for the understanding of many technical processes. It is a challenge in the petroleum industry to measure the fluid mixture flow rate accurately in crude oil. The complex nature of the crude oil mixture makes it difficult to measure the fluid mixture flow rate and content of a multiphase fluid. The conventional two phase measurement systems require separation of the two phases (i.e. oil and water) which results in the interruption of the continuous industrial process. To measure the water content in multiphase fluids, phase fraction and phase velocity measurement devices are generally used. In addition, a Venturi meter is frequently used for the flow rate measurement of the multiphase mixture which necessitates the accurate measurement of fluid mixture density as an input parameter for determination of the fluid flow rate. Over the last decade, the measurement of multi-phase flow has been a focus of attention in the oil and gas industry. A number of multiphase meters or multiphase flow meters (MPFMs) have been developed. The available meters are very expensive and are not accurate enough to give the desired results.

Major oil producers in the world require large quantities of multiphase flow meters to operate and manage oil fields and reservoirs. Multiphase flow meters are highly sophisticated devices and involve huge investments. Being a major consumer of multiphase flow meters, oil producers will be the beneficiary of any such system which is simple to use, easy to operate and at the same time, accurately calibrates multiphase meters such as multiphase flow meters and water cut meters.

In view of the forgoing, one object of the present disclosure is to provide an accurate multiphase meter calibration system that employs a two-step calibration process. First, calibrating internal single phase oil and water meters by using a single phase calibration unit, and second, calibration of a multiphase meter using the two precalibrated single phase flow meters. A further aim of the present disclosure is to provide a method for calibrating a multiphase meter, such as a multiphase flow meter or water cut meter, using the system as described herein.

BRIEF SUMMARY OF THE INVENTION

According to a first aspect, the present disclosure relates to a closed loop system for calibration of a multiphase meter comprising i) a separation vessel, comprising a first compartment for containing water and a second compartment for containing oil, ii) a first junction located downstream of the separation vessel having a first input, a second input, and an output, iii) a water pipeline configured to receive water from the first compartment and deliver it to the first input of the first junction, iv) an oil pipeline configured to receive oil from the second compartment and deliver it to the second input of the first junction, v) a multiphase meter section comprising the multiphase meter to be calibrated located downstream of the output of the first junction, vi) a second junction located downstream of the multiphase meter section having an input configured to receive water, oil or both from the multiphase meter section, a first output and a second output, vii) a single phase calibration unit located downstream of the second junction and upstream of the separation vessel, viii) a single phase pipeline located downstream of the second junction configured to receive water or oil from the first output of the second junction and deliver it to the separation vessel through the single phase calibration unit, and ix) a multiphase collecting pipeline located downstream of the second junction configured to receive water and oil from the second output of the second junction and deliver it to the separation vessel without passing through the single phase calibration unit, wherein the separation vessel, the first junction, the multiphase meter section, the second junction, and the single phase calibration unit are fluidly connected, wherein the water pipeline and oil pipeline are connected in parallel between the separation vessel and the first junction, and wherein the single phase pipeline and the multiphase collecting pipeline are connected in parallel to the second junction.

In one embodiment, the multiphase meter to be calibrated is a multiphase flow meter.

In one embodiment, the multiphase meter to be calibrated is a water cut meter.

In one embodiment, the single phase calibration unit comprises i) a calibration tank having a fluid reference level and a maximum fluid level configured to collect an amount of water or an amount of oil from the single phase pipeline, ii) a fluid level sensor configured to detect a level of water or a level of oil in the calibration tank and iii) a fluid level sighting glass configured to visualize a level of water or a level of oil in the calibration tank.

In one embodiment, the water pipeline comprises a variable flow water pump downstream of the first compartment and a water flow meter downstream of the variable flow water pump and the oil pipeline comprises a variable flow oil pump downstream of the second compartment and an oil flow meter downstream of the variable flow oil pump.

In one embodiment, the system further comprises a data acquisition unit comprising a microprocessor configured to collect and process data from and electronically connected to at least one of the water flow meter, the oil flow meter, the fluid level sensor of the single phase calibration unit and the multiphase section comprising the multiphase meter to be calibrated.

In one embodiment, the system further comprises a flow controller configured to control the speed of at least one of the variable flow water pump and the variable flow oil pump and receive data from at least one of the water flow meter and the oil flow meter.

In one embodiment, the single phase pipeline further comprises at least one solenoid valve located upstream of the single phase calibration unit and the multiphase collecting pipeline further comprises at least one solenoid valve located upstream of the separation vessel.

In one embodiment, the system further comprises a third junction located downstream of the single phase calibration unit having a first input configured to receive water or oil from the single phase pipe, a second input configured to receive water, oil or both from the multiphase collecting pipeline, and an output configured to deliver water, oil or both to the separation vessel.

In one embodiment, the single phase pipeline further comprises a fixed flow fluid return pump located downstream of the single phase calibration unit and upstream of the third junction.

In one embodiment, the single phase pipeline further comprises at least one solenoid valve located downstream of the single phase calibration unit and upstream of the fixed flow fluid return pump.

In one embodiment, the system further comprises a programmable logic controller configured to control the operation of at least one of the variable flow water pump, the variable flow oil pump, the fixed flow fluid return pump, and at least one of the solenoid valves.

In one embodiment, the water pipeline further comprises one or more valves located downstream of the water flow meter, upstream of the variable flow water pump or both and the oil pipeline further comprises one or more valves located downstream of the oil flow meter, upstream of the variable flow oil pump or both.

In one embodiment, the separation vessel is a cylindrical oil-water gravity separator and the first compartment and the second compartment are separated by a weir having a height of 0.5 to 0.8 times the diameter of the cylinder.

In one embodiment, the single phase calibration unit further comprises a drain gate valve and a removable lid.

According to a second aspect, the present disclosure relates to a method for calibrating a multiphase meter employing the system in any of its embodiments comprising i) measuring and setting a water flow rate at a predetermined value by flowing water from the first compartment to the single phase calibration unit through the multiphase meter section, ii) measuring and setting an oil flow rate at a predetermine value by flowing oil from the second compartment to the single phase calibration unit through the multiphase meter section, iii) combining water from the first compartment at the predetermined water flow rate value and oil from the second compartment at the predetermined flow rate value to form a multiphase stream downstream of the first junction, iv) flowing the multiphase stream through the multiphase meter section to the multiphase collecting pipeline, v) measuring the flow rate of the multiphase stream by means of the multiphase flow meter to be calibrated, and vi) processing the obtained data of the multiphase stream flow rate along with the predetermined water flow rate value and the predetermined oil flow rate value to calculate a calibration correction factor.

In one embodiment, the method further comprises recycling at least one of the water, the oil and the multiphase stream to the separation vessel through the single phase pipeline or the multiphase collecting pipeline.

In one embodiment, the method further comprises calibrating a water flow meter, an oil flow meter or both.

In one embodiment, at least one of a data acquisition system, a programmable logic controller and a flow controller is used in at least one of the flowing, the measuring, and the setting of the water flow rate, the oil flow rate or both.

In one embodiment, the multiphase meter to be calibrated is at least one selected from the group consisting of a multiphase flow meter and a water cut meter.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 4 is an exemplary illustration depicting the connectivity and circuitry of components of a multiphase meter calibration system 161, according to certain embodiments.

DETAILED DESCRIPTION OF THE EMBODIMENTS

Figure 1:
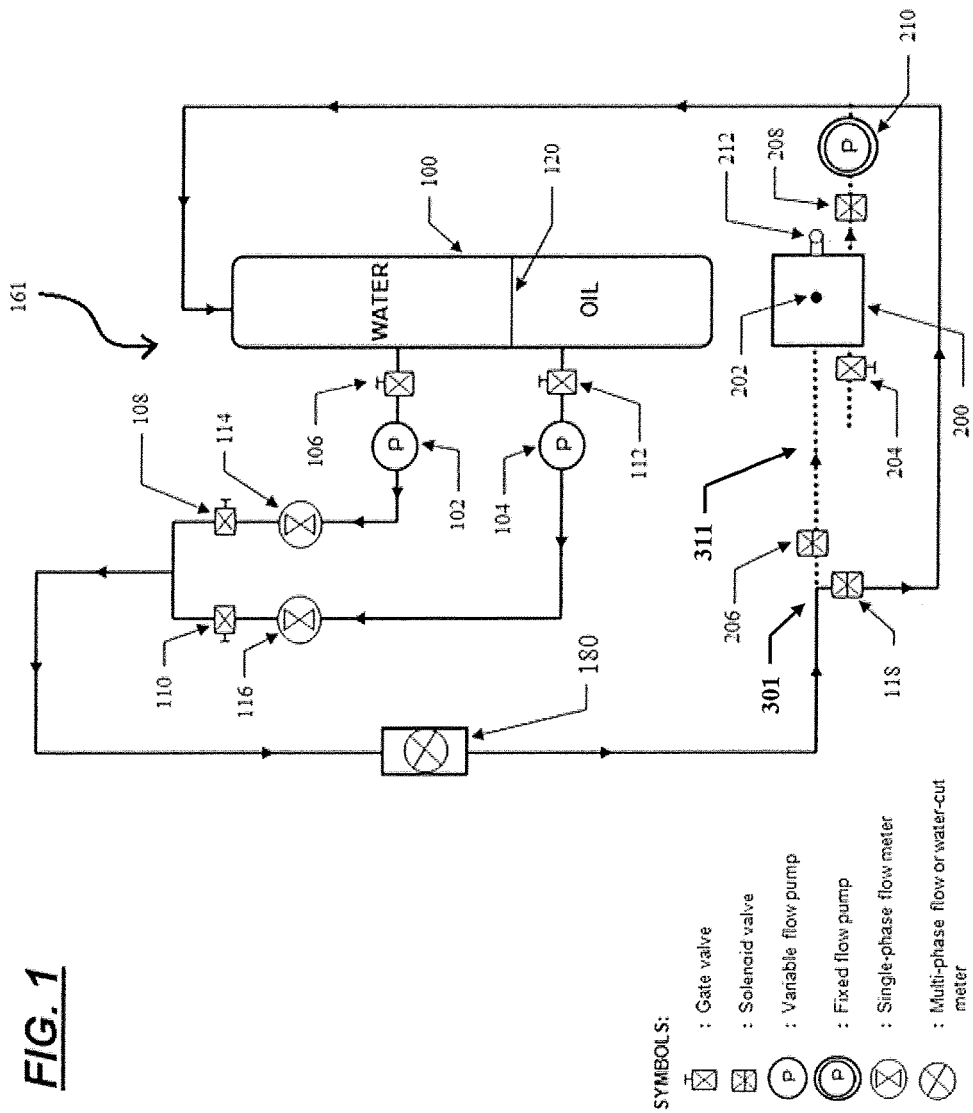
FIG. 1 is an exemplary illustration of a multiphase meter calibration system 161, according to certain embodiments.

Referring now to the drawings, wherein, like reference numerals designate identical or corresponding parts throughout the several views.

Briefly, the multiphase meter calibration system 161 as designed is a closed loop system which consists mainly of an oil-water gravity separator 100, oil (116) and water (114) flow meters, a test section for the multiphase meter to be calibrated 180, a single phase pipeline 311 or flow loop section containing the flow calibration square tank 200, manual (106, 108, 110 112, 204) and solenoid (118, 206, 208) valves, and pumps (102, 104, 210). All of these components are connected through the piping system and valves. The designed multiphase meter calibration system as described herein has a two-step calibration process for different fluid flow rates and/or water cuts. In the first calibration step, the single phase oil (116) and water (114) flow meters are calibrated separately using the single phase pipeline 311 or flow loop section by monitoring the single phase fluid level rise in the calibration tank 200 on a real time basis using a fluid level sensor 202 and/or a fluid level sighting glass 212. The second step involves the calibration of the multiphase meter to be calibrated for variable fluid flow rates and/or water cuts using the two pre-calibrated single phase flow meters (114, 116). The multiphase fluid moves in a closed loop and is separated into distinct phases by the oil-water gravity separator 100.

A microprocessor based data acquisition system 400 is used for processing the collected data from the single phase meters (114, 116) and the multiphase meter to be calibrated 180 and from the fluid level sensor 202 to calibrate the flow meters. A programmable logic controller 500 is used to control the solenoid valves and pumps during the single phase and multiphase calibration processes. A flow controller 600 is used to control the oil and water pumps speed for predefined fluid flow rates. The system has the option of choosing three different types of calibration processes (001, 002, 003) from the measurement and control panel.

The multiphase meter calibration system described herein accurately calibrates multiphase meters such as a multiphase flow meter or water cut meter. The multiphase flow parameters may be displayed in a real time basis, such as on a screen of the microprocessor based data acquisition system 400. The programmable logic controller 500 takes feedback from the data acquisition system and operates the solenoid valves (118, 206, 208) and the variable flow pumps (102, 104) accordingly for single phase and multiphase flow calibration processes as set by the calibration option (001, 002, 003) from the measurement and control panel. A flow controller (600) takes feedback from the water and oil flow meters (114, 116) to control the speed of the water and oil pumps (102, 104) based on the predefined, predetermined and/or precalibrated single phase fluid flow rates.

FIG. 1 is an exemplary illustration of a multiphase meter calibration system 161.

According to a first aspect, the present disclosure relates to a closed loop system 161 for calibration of a multiphase meter 180 comprising i) a separation vessel 100, comprising a first compartment for containing separated water and a second compartment for containing separated oil, ii) a first junction located downstream of the separation vessel 100 having a first input, a second input, and an output, iii) a water pipeline configured to receive water from the first compartment and deliver it to the first input of the first junction, iv) an oil pipeline configured to receive oil from the second compartment and deliver it to the second input of the first junction, v) a multiphase meter section comprising the multiphase meter to be calibrated 180 located downstream of the output of the first junction, vi) a second junction 301 located downstream of the multiphase meter section having an input configured to receive water, oil or both from the multiphase meter section, a first output and a second output, vii) a single phase calibration unit 261 located downstream of the second junction 301 and upstream of the separation vessel 100, viii) a single phase pipeline 311 located downstream of the second junction 301 configured to receive water or oil from the first output of the second junction and deliver it to the separation vessel 100 through the single phase calibration unit 261, and ix) a multiphase collecting pipeline located downstream of the second junction configured to receive water, oil or both from the second output of the second junction and deliver it to the separation vessel 100 without passing through the single phase calibration unit 261, wherein the separation vessel 100, the first junction, the multiphase meter section, the second junction, and the single phase calibration unit 261 are fluidly connected, wherein the water pipeline and oil pipeline are connected in parallel between the separation vessel 100 and the first junction, and wherein the single phase pipeline 311 and the multiphase collecting pipeline are connected in parallel to the second junction 301.

The system components may be directly connected or fluidly connected to one another, for example, by connecting pipes or pipelines without intervening components. In addition, one or more valves, meters, or pumps may be disposed in a variety of ways, for example, between portions of connecting pipes, or for example, integrally to any additional or other system components. These pipes, valves, meters, and pumps may control and monitor the flow of fluid through the closed loop calibration system. Depending on the size and/or intended use of the multiphase meter calibration system described herein the internal diameters of the connecting pipes and valves may range from 5-100 mm, preferably 10-60 mm, preferably 15-50 mm, preferably 20-40 mm, although the internal diameters of the connecting pipes and valves may be variable.

As used herein, "multiphase flow" refers to the simultaneous flow of materials with different states or phases (i.e. gas, liquid, or solid) and/or materials with different chemical properties but in the same state of phase (i.e. liquid-liquid systems such as oil in water). Phase may refer to thermodynamic systems throughout which all physical properties of a given material are essentially uniform. Each of the phases is considered to have a separately defined volume fraction (the sum of which is unity) and velocity field. In a preferred embodiment, this definition includes the flow of two or more thermodynamically incompatible phases with state of aggregation (i.e. an aqueous phase and an organic phase), more preferably water (an aqueous phase) and oil (an organic phase). As used herein oil refers to any neutral, nonpolar chemical substance that is a viscous liquid at ambient temperatures and is both hydrophobic and lipophilic, generally having a high carbon and hydrogen content and preferably petrochemical in origin. This type of fluid flow may be encountered in numerous industrial processes including, but not limited to, riser reactors, bubble bed column reactors, fluidized bed reactors, dryers and preferably oil production fluids.

As used herein the term "multiphase meter" refers to a device used to measure characteristics of a given multiphase material. In a preferred embodiment, the multiphase meter to be calibrated is a multiphase flow meter. As used herein a multiphase flow meter refers to a device used to measure the individual phase flow rates of constituent phases in a given flow, such as, for example oil and water in the petroleum industry. In a preferred embodiment, the multiphase meter to be calibrated is a water cut meter. As used herein a water cut meter (or online water determination meter) refers to a device used to measure the water content (or cut) of crude oil and hydrocarbons as they flow through a pipeline. Due to maintenance or high usage, multiphase meters need to be calibrated. Calibration can be defined as the process of referencing signals of known quantity that have been predetermined to suit the range of measurements required. Calibration can also refer to the mathematical operation whereby multiphase meters are standardized by determining the deviation from the predetermined standard so as to ascertain the proper correction factors. In determining the deviation from the predetermined standard, the actual multiphase measurement must be first determined. As described herein, the multiphase meter is calibrated by determining correction factors which relate the measurements of a multiphase meter or stream to the individual measurements made by similar meters or devices in each of the separated phases. This calibration may be performed in the factory where the multiphase meter is produced, in a test facility including several options for where the multiphase meter may be tested or preferably "in-situ" denoting calibration of a multiphase meter at the location or final destination where the multiphase meter is going to be put into service.

In a preferred embodiment, the multiphase meter calibration system described herein comprises a separation vessel 100 comprising a first compartment for containing separated water and a second compartment for containing separated oil. As used herein, a separation vessel or oil water separator refers to a piece of equipment used to separate oil and water mixtures into their separate components. The term separator or separation vessel in oilfield or petroleum production terminology designates a vessel designed and used for separating production fluids into their constituent components, such as oil and water. A separation vessel may be referred to in the following ways: oil and water separator, oil and gas separator, separator, stage separator, trap, knockout vessel (knockout drum, knockout trap, water knockout or liquid knockout), flash chamber (flash vessel or flash trap), expansion separator, expansion vessel, scrubber, and/or filter.

Separators can be classified by function. Separators are available for two phase operation and three phase operation. In two phase units, gas is separated from liquid (i.e. oil or water) with the gas and liquid being discharged separately or one liquid is separated from a second liquid (i.e. oil and water). In three phase separators, well fluid is separated into gas, oil, and water with the three fluids being discharged separately. Separators can be classified by operating configuration. Separators have three general configurations: vertical, horizontal and spherical. Horizontal separators may be manufactured with monotube units having one cylindrical shell and dual tube units having two cylindrical parallel shells. In terms of the present disclosure the separation vessel may be two phase, three phase, horizontal, vertical, spherical, monotube or dualtube, and mixtures thereof. Exemplary suitable types of weirs include, but are not limited to, test separators, production separators, low temperature separators, metering separators and the like. In a preferred embodiment, the separation vessel has an operation pressure of less than 300 psi, preferably less than 200 psi, preferably less than 100 psi, preferably less than 50 psi, preferably less than 25 psi, preferably less than 20 psi, preferably less than 15 psi, such as for example 14.7 psi.

The separation vessel may be constructed of a material, such as metal, plastic, ceramic or glass that can withstand the temperatures and pressures of storing and separating the multiphase fluid and that is compatible with the multiphase fluid employed in the system. The volume, dimensions, temperature and insulation characteristics of the separation vessel are based on design operational capabilities of the multiphase meter calibration system described herein.

In a preferred embodiment, separation vessel 100 is a an oil-water gravity separator in the form of a cylindrical horizontal tank having a diameter in the range of 0.2-5.0 m, preferably 0.5-4.0 m, preferably 0.6-3.0 m, preferably 0.7-2.0 m, preferably 0.8-1.5 m, preferably 0.9-1.2 m and a seam to seam (S to S) length of 0.5-30 m, preferably 1.0-25 m, preferably 2.5-20 m, preferably 5.0-18 m, preferably 7.5-15 m, preferably 8-12 m. In one embodiment, the separation vessel has a total volume of 100-20000 L, preferably 500-18000 L, preferably 1000-15000 L, preferably 2500-12000 L, preferably 5000-10000 L, preferably 6000-9000 L, preferably 7000-8000 L depending on the demands of the system. The oil-water gravity separator is divided into oil and water portions or compartments (i.e. the first compartment and the second compartment) separated by a weir 120 having a height of 0.5-0.8 times the diameter of the cylinder, preferably 0.55-0.75, preferably 0.60-0.70 times, preferably 0.64-0.68 times or about 0.66 times the diameter of the cylinder. The return fluid (i.e. water or oil from the single phase calibration unit and/or water, oil, or both from the multiphase collecting pipeline) flows back to the separation vessel, preferably the first compartment water side during the calibration process. As a result of gravity, the water stays on the water side (i.e. first compartment) of the tank, and the oil, being lighter than water, flows to the oil portion side (i.e. second compartment) of the tank. This oil-water separation method is called gravity separation and is a continuous oil-water separation process. The multiphase fluid of the present disclosure moves in a closed loop and is separated into distinct phases by the oil-water gravity separator 100.

As used herein, a weir refers to a barriers across a fluid designed to alter its flow characteristics. In most cases, weirs take the form of obstructions that pool fluid (i.e. water) behind them while also allowing it to flow steadily over their tops (i.e. lighter oil). Exemplary suitable types of weirs include, but are not limited to, a labyrinth weir, a broad-crested weir, a sharp crested weir (fayoum weir), a piano keys weir (PKW), a compound weir, a V-notch weir, and the like, and mixtures thereof.

It is equally envisaged that the multiphase meter calibration system of the present disclosure may be adapted to comprise other separation vessels. Exemplary suitable oil-water separators include, but are not limited to, an API oil water separator, a marine oily water separator, a downhole oil water separator, a gravity plate separator, an electrochemical separator, a bioremediation separator, a centrifugal oily water separator and the like. For example an API oil water separator. An API oil water separator is a device designed to separate gross amounts of oil from water effluents of oil refineries, petrochemical plants, chemical plants, natural gas processing plants and other industrial sources, they are designed according to standards of the American Petroleum Institute (API). The API separator is a gravity separation device designed by using Stokes' law to define the rise velocity of oil droplets based on their density and size, the design of the separator is based on the specific gravity difference between the oil and the water.

In a preferred embodiment, the water pipeline comprises a variable flow water pump downstream of the first compartment and a water flow meter downstream of the variable flow water pump and the oil pipeline comprises a variable flow oil pump downstream of the second compartment and an oil flow meter downstream of the variable flow oil pump. In a preferred embodiment, the water pipeline further comprises one or more valves located downstream of the water flow meter, upstream of the variable flow water pump or both and the oil pipeline further comprises one or more valves located downstream of the oil flow meter, upstream of the variable flow oil pump or both.

As used herein, a pump refers to a device that moves fluids (i.e. liquids) by mechanical action. Pumps can be classified into three major groups according to the method they use to move the fluid: direct lift, displacement, and gravity pumps. Pumps operate by a mechanism (i.e. reciprocating or rotary) and consume energy to perform mechanical work by moving the fluid. Pumps operate via many energy sources including manual operation, electricity and engines and corn in many sizes from microscopic to large industrial pumps. Exemplary acceptable water and/or oil pumps include, but are not limited to, positive displacement pumps (rotary, reciprocating, linear), impulse pumps, velocity pumps, gravity pumps, steam pumps, valveless pumps, centrifugal pumps, gear pumps, screw pumps, rotary vane pumps, plunger pumps, diaphragm pumps, piston pumps, radial piston pumps, rotary lobe pumps, progressive cavity pumps, rotary gear pumps, hydraulic pumps, peristaltic pumps, rope pumps, flexible impeller pumps, radial flow pumps, axial flow pumps, mixed flow pumps, educator jet pumps, and the like. In a preferred embodiment, the water pipeline and the oil pipeline comprise variable flow pumps, preferably variable displacement pumps. As used herein a variable displacement pump is a device that converts mechanical energy to hydraulic (fluid) energy. The displacement, or amount of fluid pumped per revolution of the pump's input shaft can be varied while the pump is running.

As used herein, a flow meter is a device for flow measurement or the quantification of bulk fluid movement. Flow can be measured in a variety of ways. Positive displacement flow meters accumulated a fixed volume of fluid and then count the number of times the volume is filled to measure flow. Other flow measurement methods rely on forces produced by the flowing stream as it overcomes a known constriction, to indirectly calculate flow. Flow may be measured by measuring the velocity of fluid over a known area. Exemplary acceptable water and/or oil flow meters include, but are not limited to, mechanical flow meters, piston meter/rotary pistons, oval gear meters, gear meters, helical gear meters, nutatitng disk meters, variable area meters, turbine flow meters, woltman meters, single jet meters, paddle wheel meters, multiple jet meters, pelton wheel meters, current meters, pressure based meters, venture meters, orifice plate meters, dall tube meters, pitot-static tube meters, multi-hole pressure probe meters, cone meters, linear resistance meters, optical flow meters, open-channel flow meters, thermal mass flow meters, vortex flow meters, electromagnetic flow meters, ultrasonic flow meters, coriolis flow meters, laser Doppler flow meters and the like.

As used herein, a valve is a device that regulates, directs or controls the flow of a fluid (gases, liquid, fluidized solids or slurries) by opening, closing or partially obstructing various passageways. In an open valve, fluid flows in a direction from higher pressure to lower pressure. Valves vary widely in form, size and application. Valves are quite diverse and may be classified into a number of acceptable exemplary basic types including, but not limited to hydraulic, pneumatic, manual, solenoid and motor. The main parts of the most usual types of valves are the body and the bonnet. These two parts form the casing that holds the fluid going through the valve. Additional valve components may include, but are not limited to, body, bonnet, ports, handle or actuator, disc, seat, stem, gaskets, valve balls, spring and trim and each part exists in several types and designs.

In a preferred embodiment, the water pipeline and the oil pipeline comprise gate valves. As used herein, a gate valve (sluice valve) is a valve that opens by lifting a round or rectangular gate/wedge out of the path of the fluid. The distinct feature of a gate valve is the sealing surfaces between the gate and seats are planar, so gate valves are often used when a straight-line flow of fluid and minimum restriction is desired. Gate valves are primarily used to permit or prevent the flow of liquids and their ability to cut through liquids allow them to often be used in the petroleum industry. The gate valves may have a rising or non-rising stem and a screw-in, union, bolted, or pressure sealed bonnet.

Figure 2:
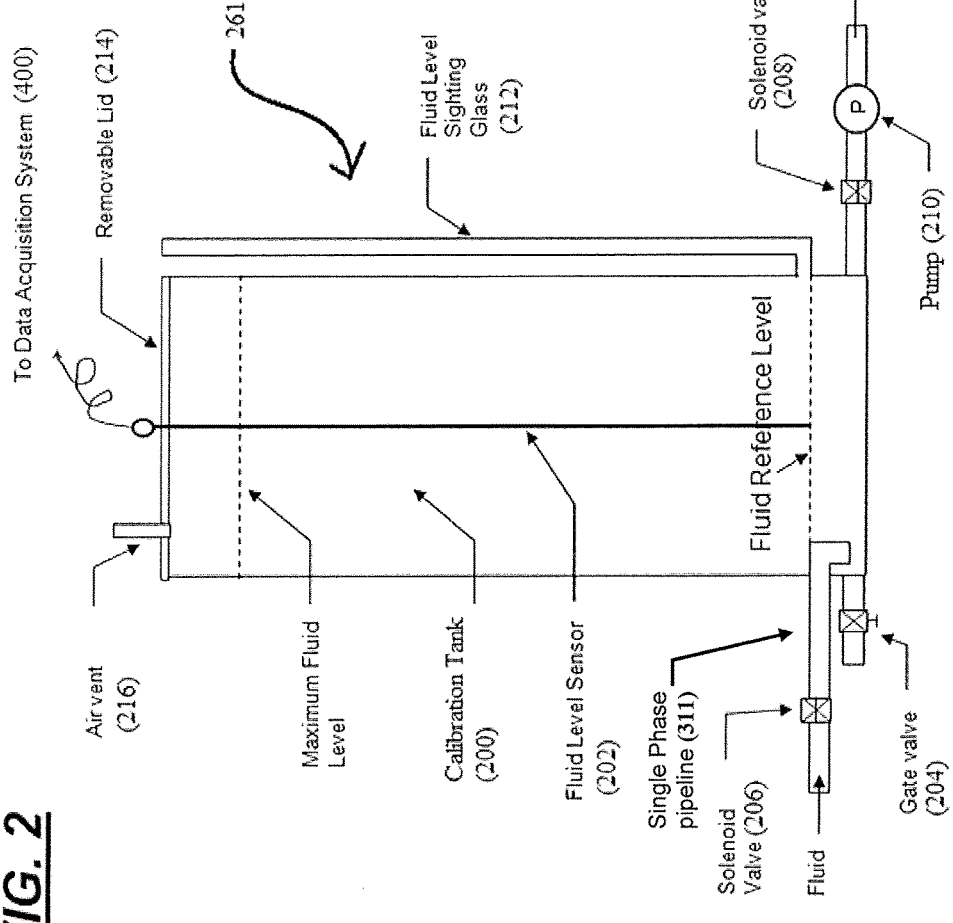
FIG. 2 is an exemplary illustration of a single phase calibration unit 261 of a multiphase meter calibration system 161, according to certain embodiments.

FIG. 2 is an exemplary illustration of the single phase calibration unit 261.

In a preferred embodiment the single phase calibration unit 261 comprises i) a calibration tank 200 having a fluid reference level and a maximum fluid level configured to collect an amount of water or an amount of oil from the single phase pipeline 311, ii) a fluid level sensor 202 configured to detect a level of water or a level of oil in the calibration tank 200, and iii) a fluid level sighting glass 212 configured to visualize a level of water or a level of oil in the calibration tank.

The calibration unit may be constructed of a material, such as metal, plastic, ceramic or glass that can withstand the temperatures and pressures of receiving and measuring the single phase fluid and that is compatible with the single phase fluids employed in the system. The volume, dimensions, temperature and insulation characteristics of the calibration tank 200 are based on design operational capabilities of the multiphase meter calibration system described herein. In a preferred embodiment, the calibration tank 200 is square in cross section and has a volume in the range of 0.1-1.0 times the volume of the separation vessel, preferably 0.2-0.75, preferably 0.3-0.6, preferably 0.35-0.5 times the volume of the separation vessel.

The single phase flow calibration section of the flow loop is used for calibration of water and oil flow meters (114, 116). It consists of a single phase flow calibration tank 200, fluid level sensor 202, fluid drain gate valve 204, inlet and outlet solenoid valves (206, 208), fluid return pump 210, fluid level sighting glass 212, and a removable lid 214. In a preferred embodiment, the removable lid 214 and the drain gate valve 204 are used for cleaning and maintenance of the calibration tank. In a preferred embodiment, the fluid level sighting glass 212 is used for manual monitoring of fluid level in the calibration tank. In certain embodiments, the air vent 216 is provided as a measure for the pressure relief inside the tank. In a preferred embodiment, the calibration tank contains the fluid level sensor 202 for monitoring the fluid level in the tank on a real time basis. The fluid level sensor monitors the fluid level from the reference level to the maximum level in the tank. The fluid level in the calibration tank is recorded automatically on a real time basis by the data acquisition system 400 for different fluid flow rates. Exemplary fluid level sensors include, but are not limited to, point level detection of liquids (magnetic and mechanical float, pneumatic, conductive), both point level detection or continuous monitoring (ultrasonic, capacitance, optical interface, microwave), and continuous level measurement (magnetostrictive, resistive chain, magnetoresistive, hydrostatic pressure, air bubbler, gamma ray) and the like.

Before initiating a single phase calibration process, the calibration tank 200 needs to be emptied by opening the solenoid valve 208 and running the return fluid pump 210. During the single phase flow meter calibration, the inlet solenoid valve 206 is opened and the outlet solenoid valve 208 remains closed. The fluid level sensor 202 is connected to the data acquisition system 400 for recording the fluid level in the calibration tank 200 on a real time basis. Once the maximum fluid level is reached in the calibration tank, the data acquisition system sends the signal to the programmable logic controller 500 which stops the pump (102 or 104) and closes the inlet solenoid valve (206).

In a preferred embodiment, the single phase pipeline 311 further comprises at least one solenoid valve located upstream of the single phase calibration unit and the multiphase collecting pipeline further comprises at least one solenoid valve located upstream of the separation vessel. In a preferred embodiment, the multiphase meter calibration system further comprises a third junction located downstream of the single phase calibration unit having a first input configured to receive water or oil from the single phase pipeline 311, a second input configured to receive water, oil, or both from the multiphase collecting pipeline, and an output configured to deliver water, oil, or both to the separation vessel. In a preferred embodiment, the single phase pipeline 311 further comprises a fixed flow fluid return pump located downstream of the single phase calibration unit and upstream of the third junction. In a preferred embodiment, the single phase pipeline 311 further comprises at least one solenoid valve located downstream of the single phase calibration unit and upstream of the fixed flow fluid return pump.

As used herein, a solenoid valve refers to an electromechanically operated valve. The valve is controlled by an electric current through a solenoid: in the case of a two-port valve the flow is switched on or off. Solenoid valves are the most frequently used elements in fluidics. Their tasks are to shut off, release, dose, distribute or mix fluids. They are found in many application areas. Solenoids offer fast and safe switching, high reliability, long service life, good medium compatibility of the materials used, low control power and compact design. In addition to the plunger type actuator which is used most frequently, pivoted armature actuators and rocker actuators are also used. In certain embodiments, the solenoid valves may be internally piloted.

Solenoid valve designs have many variations and challenges, common components of a solenoid valve include, but are not limited to, solenoid subassembly (retaining clip, coil clip, solenoid coil, magnetic return path, core tube, armature tube, plunger tube, solenoid valve tube, sleeve, guide assembly, plugnut, fixed core, shading coil, shading ring, core spring, counter spring, core, plunger, armature), core tube-bonnet seal, bonnet (cover), bonnet diaphragm body seal, hanger spring, backup washer, diaphragm (bleed hole), disk, and valve body (seat). The valve body and seals must be compatible with the fluid (i.e. water and oil) and common materials include, but are not limited to, brass, stainless steel, aluminum and plastic. The solenoid valves of the present disclosure may be one- or two-solenoid valves, direct current or alternating current powered, and encompass a wide number of ways and positions.

In a preferred embodiment, the fixed flow fluid return pump is a fixed displacement pump, in which the displacement or flow through the pump per rotation or revolution of the pump cannot be adjusted.

In a preferred embodiment, the multiphase meter calibration system further comprises a data acquisition unit comprising a microprocessor configured to collect and process data from and electronically connected to at least one of the water flow meter, the oil flow meter, the fluid level sensor of the single phase calibration unit and the multiphase section comprising the multiphase meter to be calibrated. In a preferred embodiment, the multiphase meter calibration system further comprises a flow controller configured to control the speed of at least one of the variable flow water pump and the variable flow oil pump and receive data from at least one of the water flow meter and the oil flow meter. In a preferred embodiment, the multiphase meter calibration system further comprises a programmable logic controller configured to control the operation of at least one of the variable flow water pump, the variable flow oil pump, the fixed flow fluid return pump, and at least one of the solenoid valves.

Figure 3:
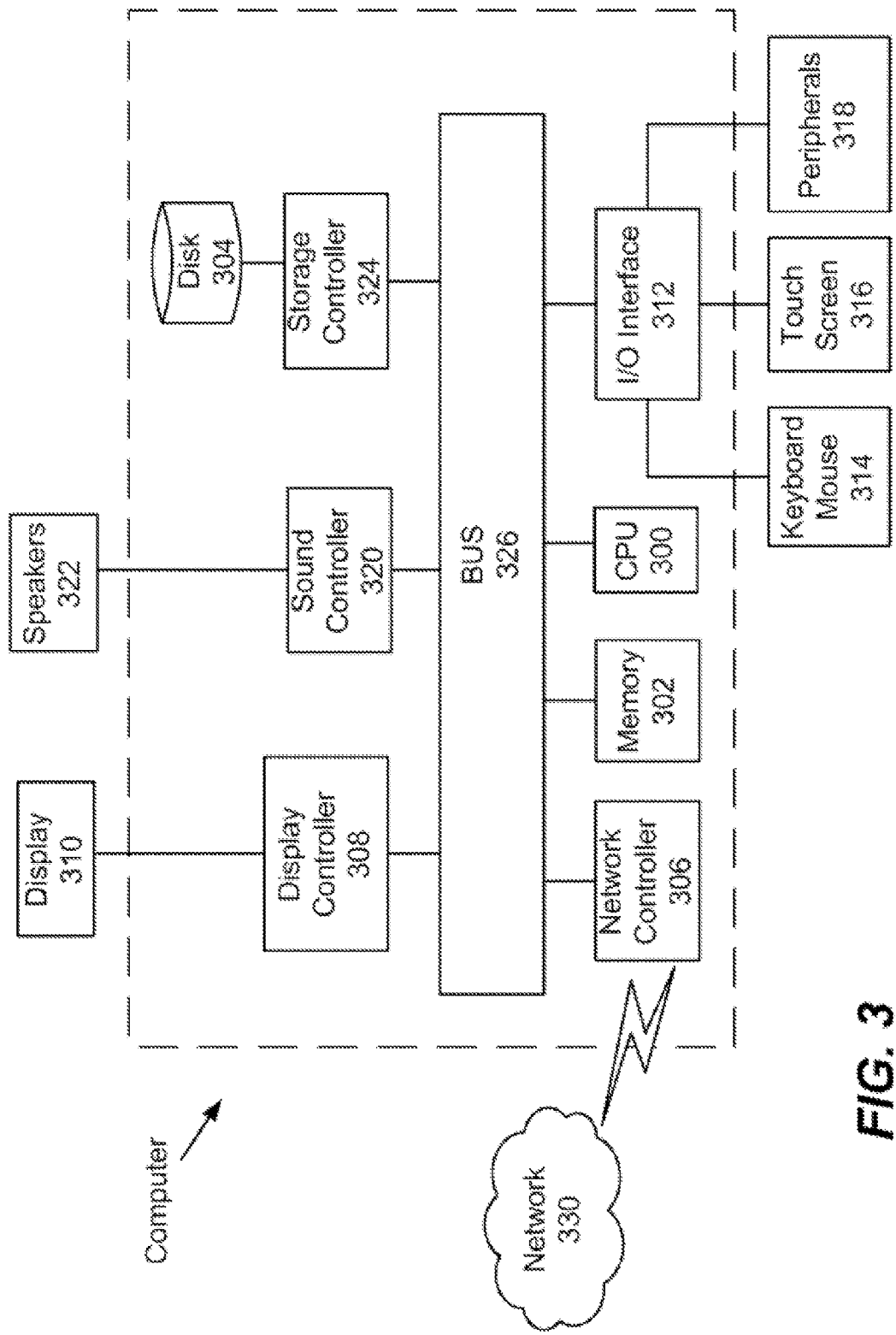
FIG. 3 is an exemplary illustration depicting the circuitry of a measurement and control unit of a multiphase meter calibration system 161, according to certain embodiments.

In certain embodiments, the calibration system comprises a measurement and control unit and/or data acquisition unit in the form of a computer. FIG. 3 is an exemplary illustration of a computer that acts as the measurement and control unit and/or a data acquisition unit comprising a microprocessor. FIG. 4 is an exemplary illustration depicting the connectivity of components of the multiphase meter calibration system 161.

A hardware description of the computer according to exemplary embodiments is described with reference to FIG. 3. In FIG. 3, the computer includes a CPU 300 which performs the processes described herein. The process data and instructions may be stored in memory 302. These processes and instructions may also be stored on a storage medium disk 304 such as a hard drive (HDD) or portable storage medium or may be stored remotely. Further, the claimed advancements are not limited by the form of the computer readable media on which the instructions of the inventive process are stored. For example, the instructions may be stored on CDs, DVDs, in FLASH memory, RAM, ROM, PROM, EPROM, EEPROM, hard disk or any other information processing device with which the computer communicates, such as a server or computer.

Further, the claimed advancements may be provided as a utility application, background daemon, or component of an operating system such as Microsoft Windows, UNIX, Solaris, LINUX, Apple MAC-OS and other systems known to those of ordinary skill in the art.

The hardware elements in order to achieve the computer may be realized by various circuitry elements, known to those of ordinary skill in the art. For example, CPU 300 may be a Xenon or Core processor from Intel of America or an Opteron processor from AMD of America, or may be other processor types that would be recognized by one of ordinary skill in the art. Alternatively, the CPU 300 may be implemented on an FPGA, ASIC, PLD or using discrete logic circuits, as one of ordinary skill in the art would recognize. Further, CPU 300 may be implemented as multiple processors cooperatively working in parallel to perform the instructions of the inventive process described herein.

The computer in FIG. 3 also includes a network controller 306, such as an Intel Ethernet PRO network interface card from Intel Corporation of America, for interfacing with network 330. As can be appreciated, the network 330 can be a public network, such as the Internet, or a private network such as an LAN or WAN network, or any combination thereof and can also include PSTN or ISDN sub-networks. The network 330 can also be wired, such as an Ethernet network, or can be wireless such as a cellular network including EDGE, 3G and 4G wireless cellular systems. The wireless network can also be WiFi, Bluetooth, or any other wireless form of communication that is known.

The computer further includes a display controller 308, such as a NVIDIA GeForce GTX or Quadro graphics adaptor from NVIDIA Corporation of America for interfacing with display 310, such as a Hewlett Packard HPL2445w LCD monitor. A general purpose I/O interface 312 interfaces with a keyboard and/or mouse 314 as well as a touch screen panel 316 on or separate from display 310. The general purpose I/O interface also connects to a variety of peripherals 318 including printers and scanners, such as an OfficeJet or DeskJet from Hewlett Packard.

A sound controller 320 is also provided in the computer, such as Sound Blaster X-Fi Titanium from Creative, to interface with speakers/microphone 322 thereby providing sounds and or music.

The general purpose storage controller 324 connects the storage medium disk 304 with communication bus 326, which may be an ISA, EISA, VESA, PCI, or similar, for interconnecting all of the components of the computer. A description of the general features and functionality of the display 310, keyboard and/or mouse 314, as well as the display controller 308, storage controller 324, network controller 306, sound controller 320, and general purpose I/O interface 312 is omitted herein for brevity as these features are known to those of ordinary skill in the art.

In a preferred embodiment, the multiphase meter calibration system further comprises a data acquisition unit comprising a microprocessor. The water and oil flow meters (114, 116), a multiphase meter, such as a multiphase flow meter or water cut meter (180), and a fluid level sensor 202 are connected to the microprocessor based data acquisition system 400. In a preferred embodiment, the multiphase meter calibration system further comprises a programmable logic controller. The programmable logic controller 500 is used to control the ON/OFF operation of the pumps (102, 104, 210) and the solenoid valves (118, 206, 208). The controller takes feedback from the calibration options (001, 002, 003) and from the fluid level sensor 202 to operate the pumps and solenoid valves accordingly.

As used herein, a programmable logic controller (PLC) or programmable controller refers to a digital computer used for automation of typically industrial electromechanical processes. Programmable logic controllers may be used in many machines, in many industries. Programmable logic controllers are designed for multiple arrangements of digital and analog inputs and outputs, extended temperature ranges, immunity to electrical noise, and resistance to vibration and impact. Programs to control machine operations are typically stored in battery back-up or nonvolatile memory. A programmable logic controller is an example of a "hard" real time system since output results must be produced in response to input conditions within a limited time, otherwise unintended operation will result.

In a preferred embodiment, the multiphase meter calibration system as described herein further comprises a flow controller. In a preferred embodiment, the flow controller 600 is used to control the speed of the variable flow pumps (102, 104) based on the signal received from the water and oil flow meters (114, 116). The flow controller has the option of selecting the desired oil and water flow rates.

As used herein a flow controller refers to a device used to measure and/or control the flow of liquids and gases. In certain embodiments, the flow controller may be a mass flow controller (MFC). A mass flow controller is designed and calibrated to control one or more specific types of liquids or gasses in a particular range of flow rates. The mass flow controller can be given a set point from 0% to 100% of its full scale range but is typically operated in the 10% to 90% of its full scale range where the best accuracy is achieved. The device will then control the rate of flow to the given set point. In certain embodiments, the flow controller may be either analog or digital. A digital flow controller may be advantageous as it is usually able to control more than one type of fluid whereas in some instances an analog flow controller is limited to the fluid for which it has been calibrated.

In certain embodiments, a mass flow controller may comprise an inlet port, an outlet port, a mass flow sensor and a proportional control valve. The mass flow controller may be fitted with a closed loop control system which is given an input signal by the operator (or an external circuit/computer) the it compares to the value from the mass flow sensor and adjusts the proportional valve accordingly to achieve the required flow. The flow rate may be specified as a percentage of its calibrated full scale flow and may be supplied to the mass flow controller as a voltage signal. Often, mass flow controllers require the supply of liquid (or gas) to be within a specific pressure range. Low pressure may starve the mass flow controller causing it to fail to achieve its set point. High pressure may cause erratic flow rates.

The below is an exemplary operation of the multiphase meter calibration system described herein. The exemplary operation procedure is intended to further illustrate methods and protocols for operating the system and calibrating a multiphase meter, such as a multiphase flow meter or water cut meter. It is not intended to limit the scope of the claims.

In certain embodiments, the following steps are to be used for the calibration of a multiphase meter such as a multiphase flow meter or a water cut meter employing the closed loop system for calibration of a multiphase meter 161 described herein in any of its embodiments. The calibration of the single phase flow meters is done for water and oil flow meters (114, 116) separately using the single phase pipeline or flow loop section of the designed calibration system. The single-phase calibration option uses the single phase flow calibration tank 200 for the monitoring of fluid flow rates. The manual gate valves (106, 112) are provided for safety reasons and in some embodiments may always be kept in open positions. The drain gate valve 204 in preferred embodiments may always be kept in a closed position unless the cleaning of the calibration tank 200 requires it to be opened.

In certain embodiments, the following steps are to be used for the calibration of the water flow meter 114 of the closed loop system for calibration of a multiphase meter 161 described herein in any of its embodiments. Before starting the calibration of the water flow meter 114 all solenoid valves (118, 206, 208) are kept in a closed position, preferably by the programmable logic controller 500. The gate valves (106, 108) should remain in an open position while the gate valves (110, 112) are in a closed position. The desired water flow rate should be set in the flow controller 600 and the water flow meter calibration option (001) should be selected from the measurement and control unit of the calibration system.

Based on the selection of the water flow meter calibration option (001), the programmable logic controller 500 takes the feedback signal from the fluid level sensor 202 and checks the fluid level in the calibration tank 200. If the fluid level in the tank is above the fluid reference level, the logic controller opens the solenoid valve 208 and starts the return fluid pump 210. Once the fluid level falls below the reference level in the tank, it closes the solenoid valve 208 and stops the pump 210. Subsequently, or if initially the fluid level in the tank is below the reference level, the logic controller 500 opens the solenoid valve 118 and starts the variable flow water pump 102. The water pump 102 draws water from the first compartment of the separation vessel 100, preferably an oil-water gravity separator and pumps it through the water pipeline containing the water flow meter 114, the multiphase meter section, and the multiphase collecting pipeline.

Once the desired water flow rate is achieved by the flow controller 600 it sends the signal to the logic controller 500 which closes the solenoid valve 118 and opens the inlet solenoid valve 206 of the single phase pipeline. The water then enters the single phase calibration unit 261, specifically the calibration tank 200. Once water enters the calibration tank 200 the data acquisition system 400 records the real-time data from the fluid level sensor 202 and the water flow meter 114. Once the maximum fluid level is reached in the tank, the data acquisition system 400 sends the signal to the programmable logic controller 500 which stops the pump 102 and closes the inlet solenoid valve 206.

For additional water flow rates, a plurality of desired water flow rates can be selected and the above described procedure repeated until a full range of water flow rates for the water flow meter 114 has been covered. The experimental real time data for the plurality of water flow rates recorded by the data acquisition system 400 from the fluid level sensor 202 may be plotted against the data obtained from the water flow meter 114 to generate a calibration constant for the water flow meter 114. The measured water volume flow rate ($V_w$) for a fixed speed of the variable flow pump 102 can be expressed by an equation of formula (I).

$$V_w = \frac{\Delta h_w A}{\Delta t} \qquad (I)$$

In this equation $\Delta h_w = h_{2w} - h_{1w}$, $V_w$ is the water volume flow rate for a fixed pump speed in m³/s, $\Delta h_w$ is the rise in water level (in meters) in the calibration tank during the time interval $\Delta t$ ($t_2 - t_1$) in seconds and A is the cross sectional area of the calibration tank (200) in m². For different set speeds of the water pump 102, the actual water volume flow rate can be obtained from the equation of formula (I). The measured water flow rates and data obtained by varying the speed of the water pump 102 is compared with data obtained from the water flow meter 114. The water flow meter 114 data may be plotted versus the measured water flow rates data and a calibration constant of the water flow meter 114 determined.

In certain embodiments, the following steps are to be used for the calibration of the oil flow meter 116 of the closed loop system for calibration of a multiphase meter 161 described herein in any of its embodiments. Before starting the calibration of the oil flow meter 116 all solenoid valves (118, 206, 208) are kept in a closed position, preferably by the programmable logic controller 500. The gate valves (106, 108) should remain in a closed position while the gate valves (110, 112) are in an open position. The desired oil flow rate should be set in the flow controller 600 and the oil flow meter calibration option (002) should be selected from the measurement and control unit of the calibration system.

Based on the selection of the oil flow meter calibration option (002), the programmable logic controller 500 takes the feedback signal from the fluid level sensor 202 and checks the fluid level in the calibration tank 200. If the fluid level in the tank is above the fluid reference level, the logic controller opens the solenoid valve 208 and starts the return fluid pump 210. Once the fluid level falls below the reference level in the tank, it closes the solenoid valve 208 and stops the pump 210. Subsequently, or if initially the fluid level in the tank is below the reference level, the logic controller 500 opens the solenoid valve 118 and starts the variable flow oil pump 104. The oil pump 104 draws oil from the second compartment of the separation vessel 100, preferably an oil-water gravity separator and pumps it through the oil pipeline containing the oil flow meter 116, the multiphase meter section, and the multiphase collecting pipeline.

Once the desired oil flow rate is achieved by the flow controller 600 it sends the signal to the logic controller 500 which closes the solenoid valve 118 and opens the inlet solenoid valve 206 of the single phase pipeline. The oil then enters the single phase calibration unit 261, specifically the calibration tank 200. Once oil enters the calibration tank 200 the data acquisition system 400 records the real-time data from the fluid level sensor 202 and the oil flow meter 116. Once the maximum fluid level is reached in the tank, the data acquisition system 400 sends the signal to the programmable logic controller 500 which stops the pump 104 and closes the inlet solenoid valve 206.

For additional oil flow rates, a plurality of desired oil flow rates can be selected and the above described procedure repeated until a full range of oil flow rates for the oil flow meter 116 has been covered. The experimental real time data for the plurality of oil flow rates recorded by the data acquisition system 400 from the fluid level sensor 202 may be plotted against the data obtained from the oil flow meter 116 to generate a calibration constant for the oil flow meter 116. The measured oil volume flow rate ($V_o$) for a fixed speed of the variable flow pump 104 can be expressed by an equation of formula (II).

$$V_o = \frac{\Delta h_o A}{\Delta t} \quad \text{(II)}$$

In this equation $\Delta h_o = h_{2o} - h_{1o}$, $V_o$ is the oil volume flow rate for a fixed pump speed in m³/s, $\Delta h_o$ is the rise in oil level (in meters) in the calibration tank during the time interval $\Delta t$ ($t_2 - t_1$) in seconds and A is the cross sectional area of the calibration tank (200) in m². For different set speeds of the oil pump 104, the actual oil volume flow rate can be obtained from the equation of formula (II). The measured oil flow rates and data obtained by varying the speed of the oil pump 104 is compared with data obtained from the oil flow meter 116. The oil flow meter 116 data may be plotted versus the measured oil flow rates data and a calibration constant of the oil flow meter 116 determined.

In certain embodiments, the following steps are to be used for the calibration of a multiphase meter such as a multiphase flow meter or a water cut meter employing the closed loop system for calibration of a multiphase meter 161 described herein in any of its embodiments. In a preferred embodiment, the multiphase flow meter or water cut meter calibration is carried out by using the pre-calibrated single phase water flow meter 114, the pre-calibrated single phase oil flow meter 116 or both as previously described herein. A test section in the multiphase meter section may be installed comprising a multiphase meter to be calibrated 180, preferably a multiphase flow meter or water cut meter.

Before starting the calibration of the multiphase flow meter or water cut meter the gate valves (106, 108, 110, 112) are to be kept in the open position. The solenoid valve 118 is to be kept in an open position, preferably by the programmable logic controller 500 and the solenoid valves (206, 208) are to remain in a closed position during the calibration process. The desired multiphase fluid mixture flow rate or water cut should be set in the flow controller 600 and the multiphase meter calibration option (003) should be selected from the measurement and control unit of the calibration system.

Based on the selection of the multiphase meter calibration option (003), the variable flow water pump 102 draws water from first compartment of the separation vessel 100 and the variable flow oil pump 104 draws oil from the second compartment of the separation vessel 100 and flows the water through the water pipeline and oil through the oil pipeline through the first junction and into the multiphase meter section comprising the multiphase meter to be calibrated 180. Once the desired multiphase fluid mixture flow rate or water cut is achieved by the flow controller 600 it sends the signal to the programmable logic controller 500 to instruct the data acquisition system 400 to record the real time data of the single phase water flow meter 114 and the single phase oil meter 116 together with that of the multiphase meter to be calibrated 180. For additional multiphase fluid mixture flow rates or water cuts, a plurality of desired multiphase fluid mixture flow rates or water cuts can be selected and the above described procedure repeated until a full range of multiphase fluid mixture flow rates or water cuts for the multiphase meter to be calibrated 180 has been covered. The experimental data, for the plurality of multiphase fluid mixture flow rates or water cuts recorded by the data acquisition system 400 from the water and oil flow meters (114, 116) may be plotted against the data obtained from the multiphase flow meter or water cut meter to be calibrated 180 to generate a calibration constant for the multiphase flow meter or water cut meter to be calibrated 180.

For an exemplary water cut meter, the water cut ($\lambda$) is the volume fraction of water in a multiphase fluid mixture. For homogenous flow and for a fixed speed of the flow pumps (102, 104), the water cut ($\lambda$) can be expressed by an equation of formula (III).

$$\lambda = \frac{V_w}{V_w + V_o} \quad \text{(III)}$$

In this equation λ is the water cut, $V_w$ is the water volume flow rate from the water flow meter (114) in m³/s and $V_o$ is the oil volume flow rate from the oil flow meter (116) in m³/s. The pre-calibrated water flow meter 114 and oil flow meter 116 data can be used to calculate the water cuts for different speeds of the water flow pump 102 and the oil flow pump 104 from the equation of formula (III). The measured water cuts data obtained by varying the speed of the water pump 102 and the oil pump 104 is compared with the data obtained from the water cut meter to be calibrated 180. The water cut meter to be calibrated data may be plotted versus the measured water cuts data and a calibration constant of the water cut meter to be calibrated determined.

For an exemplary multiphase flow meter, the multiphase fluid flow rate may be determined directly from the pre-calibrated water flow meter 114 and oil flow meter 116 and expressed by an equation of formula (IV).

$$V_m = V_w + V_o \quad \text{(IV):}$$

In this equation $V_m$ is the multiphase fluid flow rate in m³/s, $V_w$ is the water volume flow rate from the water flow meter (114) in m³/s and $V_o$ is the oil volume flow rate from the oil flow meter (116) in m³/s. The measured multiphase fluid flow rates data obtained by varying the speed of the water pump 102 and the oil pump 104 is compared with the data obtained from the multiphase flow meter to be calibrated 180. The multiphase flow meter to be calibrated 180 data may be plotted versus the measured multiphase fluid flow rates data and a calibration constant of the multiphase flow meter to be calibrated 180 determined.

According to a second aspect the present disclosure relates to a method for calibrating a multiphase meter employing the system of the present disclosure described herein in any of its embodiments comprising i) measuring and setting a water flow rate at a predetermined value by flow water from the first compartment to the single phase calibration unit 261 through the multiphase meter section, ii) measuring and setting an oil flow rate at a predetermined value by flowing oil from the second compartment to the single phase calibration unit 261 through the multiphase meter section, iii) combining water from the first compartment at the predetermined water flow rate value and oil from the second compartment at the predetermined flow rate value to form a multiphase stream downstream of the first junction, iv) flowing the multiphase stream through the multiphase meter section to the multiphase collecting pipeline, v) measuring the flow rate of the multiphase stream by means of the multiphase flow meter to be calibrated, and vi) processing the obtained data of the multiphase stream flow rate along with the predetermined water flow rate value and the predetermined oil flow rate value to calculate a calibration correction factor.

In a preferred embodiment, the method further comprises recycling at least one of the water, the oil and the multiphase stream to the separation vessel through the single phase pipeline or the multiphase collecting pipeline. In a preferred embodiment, the method further comprises calibrating a single phase water flow meter, a single phase oil flow meter, or both. In a preferred embodiment, at least one of a data acquisition system, a programmable logic controller and a flow controller is used in at least one of the flowing, the measuring, and the setting of the water flow rate, the oil flow rate, or both. In a preferred embodiment, the multiphase meter to be calibrated is at least one selected from the group consisting of a multiphase flow meter and a water cut meter.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A closed loop system for calibration of a multiphase meter, comprising:
   a separation vessel, comprising a first compartment for containing water and a second compartment for containing oil;
   a first junction located downstream of the separation vessel having a first input, a second input and an output;
   a water pipeline configured to receive water from the first compartment and deliver it to the first input of the first junction;
   an oil pipeline configured to receive oil from the second compartment and deliver it to the second input of the first junction;
   a multiphase meter section comprising the multiphase meter to be calibrated located downstream of the output of the first junction;
   a second junction located downstream of the multiphase meter section having an input configured to receive water, oil or both from the multiphase meter section, and having a first output, and a second output;
   a single phase calibration unit located downstream of the second junction and upstream of the separation vessel;
   a single phase pipeline located downstream of the second junction configured to receive water or oil from the first output of the second junction and deliver it to the separation vessel through the single phase calibration unit;
   a multiphase collecting pipeline located downstream of the second junction configured to receive water, oil or both from the second output of the second junction and deliver it to the separation vessel without passing through the single phase calibration unit;
   wherein the separation vessel, the first junction, the multiphase meter section, the second junction and the single phase calibration unit are fluidly connected;
   wherein the water pipeline and oil pipeline are connected in parallel between the separation vessel and the first junction; and
   wherein the single phase pipeline and the multiphase collecting pipeline are connected in parallel to the second junction.

2. The system of claim 1, wherein the multiphase meter to be calibrated is a multiphase flow meter.

3. The system of claim 1, wherein the multiphase meter to be calibrated is a water cut meter.

4. The system of claim 1, wherein the single phase calibration unit comprises:
   a calibration tank having a fluid reference level and a maximum fluid level configured to collect an amount of water or an amount of oil from the single phase pipeline;

a fluid level sensor configured to detect a level of water or a level of oil in the calibration tank; and a fluid level sighting glass configured to visualize a level of water or a level of oil in the calibration tank.

5. The system of claim 4, wherein the water pipeline comprises a variable flow water pump downstream of the first compartment and a water flow meter downstream of the variable flow water pump and the oil pipeline comprises a variable flow oil pump downstream of the second compartment and an oil flow meter downstream of the variable flow oil pump.

6. The system of claim 5, further comprising a data acquisition unit comprising a microprocessor configured to collect and process data from and electronically connected to at least one of the water flow meter, the oil flow meter, the fluid level sensor of the single phase calibration unit and the multiphase section comprising the multiphase meter to be calibrated.

7. The system of claim 5, further comprising a flow controller configured to control the speed of at least one of the variable flow water pump and the variable flow oil pump and receive data from at least one of the water flow meter and the oil flow meter.

8. The system of claim 5, wherein the single phase pipeline further comprises at least one solenoid valve located upstream of the single phase calibration unit and the multiphase collecting pipeline further comprises at least one solenoid valve located upstream of the separation vessel.

9. The system of claim 8, further comprising a third junction located downstream of the single phase calibration unit having a first input configured to receive water or oil from the single phase pipeline, a second input configured to receive water, oil or both from the multiphase collecting pipeline, and an output configured to deliver water, oil or both to the separation vessel.

10. The system of claim 9, wherein the single phase pipeline further comprises a fixed flow fluid return pump located downstream of the single phase calibration unit and upstream of the third junction.

11. The system of claim 10, wherein the single phase pipeline further comprises at least one solenoid valve located downstream of the single phase calibration unit and upstream of the fixed flow fluid return pump.

12. The system of claim 11, further comprising a programmable logic controller configured to control the operation at least one of the variable flow water pump, the variable flow oil pump, the fixed flow fluid return pump, and at least one of the solenoid valves.

13. The system of claim 5, wherein the water pipeline further comprises one or more valves located downstream of the water flow meter, upstream of the variable flow water pump or both and the oil pipeline further comprises one or more valves located downstream of the oil flow meter, upstream of the variable flow oil pump or both.

14. The system of claim 1, wherein the separation vessel is a cylindrical oil-water gravity separator and the first compartment and the second compartment are separated by a weir having a height of 0.5 to 0.8 times the diameter of the cylinder.

15. The system of claim 2, wherein the single phase calibration unit further comprises a drain gate valve and a removable lid.

16. A method for calibrating a multiphase meter employing the system of claim 1, comprising:

measuring and setting a water flow rate at a predetermined value by flowing water from the first compartment to the single phase calibration unit through the multiphase meter section;

measuring and setting an oil flow rate at a predetermined value by flowing oil from the second compartment to the single phase calibration unit through the multiphase meter section;

combining water from the first compartment at the predetermined water flow rate value and oil from the second compartment at the predetermined flow rate value to form a multiphase stream downstream of the first junction;

flowing the multiphase stream through the multiphase meter section to the multiphase collecting pipeline;

measuring the flow rate of the multiphase stream by means of the multiphase flow meter to be calibrated; and processing the obtained data of the multiphase stream flow rate along with the predetermined water flow rate value and the predetermined oil flow rate value to calculate a calibration correction factor.

17. The method of claim 16, further comprising recycling at least one of the water, the oil and the multiphase stream to the separation vessel through the single phase pipeline or the multiphase collecting pipeline.

18. The method of claim 16, further comprising calibrating a water flow meter, an oil flow meter, or both.

19. The method of claim 16, wherein at least one of a data acquisition system, a programmable logic controller and a flow controller is used in at least one of the flowing, the measuring, and the setting of the water flow rate, the oil flow rate or both.

20. The method of claim 16, wherein the multiphase meter to be calibrated is at least one selected from the group consisting of a multiphase flow meter and a water cut meter.

* * * * *